United States Patent [19]
Newman et al.

[11] Patent Number: 5,982,337
[45] Date of Patent: Nov. 9, 1999

[54] CELLULAR ANTENNAS FOR STRATOSPHERE COVERAGE OF MULTI-BAND ANNULAR EARTH PATTERN

[75] Inventors: Edward M. Newman, Nesconset; Alfred R. Lopez, Commack, both of N.Y.

[73] Assignee: Marconi Aerospace Systems Inc., Greenlawn, N.Y.

[21] Appl. No.: 09/087,356

[22] Filed: May 29, 1998

Related U.S. Application Data

[63] Continuation of application No. 09/027,413, Feb. 20, 1998, abandoned.

[51] Int. Cl.[6] .................................................. H01Q 21/00
[52] U.S. Cl. ...................... 343/816; 343/795; 343/820; 343/824
[58] Field of Search .................. 343/814, 816, 343/820, 824, 813, 795, 810, 850, 853, 858, 800; 342/173, 360, 460

[56] References Cited

U.S. PATENT DOCUMENTS

| | | | |
|---|---|---|---|
| 2,464,276 | 3/1949 | Varian | 343/816 |
| 2,743,441 | 4/1956 | Granqvist | 343/815 |
| 2,929,581 | 3/1960 | Johnson, Jr. | 244/30 |
| 3,295,134 | 12/1966 | Lowe | 343/824 |
| 4,079,380 | 3/1978 | Esry et al. | 343/854 |
| 5,017,931 | 5/1991 | Carlyon | 343/700 MS |
| 5,418,540 | 5/1995 | Thompson | 342/379 |
| 5,589,843 | 12/1996 | Meredith et al. | 343/820 |
| 5,710,569 | 1/1998 | Oh et al. | 343/817 |
| 5,724,666 | 3/1998 | Dent | 455/562 |
| 5,872,547 | 2/1999 | Martek | 343/815 |

*Primary Examiner*—Don Wong
*Assistant Examiner*—Tho Phan
*Attorney, Agent, or Firm*—Edward A. Onders; Kenneth P. Robinson

[57] ABSTRACT

Cellular antenna systems are provided for airship-type support at a position in the stratosphere. A single antenna system (20) may provide cellular communication for earth-based users located anywhere within a circle 400 miles in diameter (10). By use of array assemblies (21*a*) each providing 12 side-by-side beam positions per quadrant, with higher and lower elevation beams (32*a′*, 36*a′*) at each beam position, coverage can be provided for 96 cells arranged side-by-side in inner and outer annular bands (10). A turnstile-type antenna (26) provides coverage for a 97th central circular cell. By allocation of available groups of cellular frequencies in repetitive patterns around the outer annular band (1–6, FIG. 1), with frequency reuse in offset positions around the inner annular band, 16 times frequency reuse is provided while maintaining acceptable co-channel interference levels. A total number of channels of the order of 5,800 channels is thus provided for AMPS band A or band B usage with a single antenna system. Arrangements employing 6 dB attenuation (60) of signal levels at array edge elements provide reduced co-channel interference without diminishing antenna system gain at beam crossover angles.

21 Claims, 8 Drawing Sheets

CELLULAR ANTENNAS FOR STRATOSPHERE COVERAGE OF MULTI-BAND ANNULAR EARTH PATTERN

RELATED APPLICATIONS

This application is a continuation of application Ser. No. 09/027,413 filed on Feb. 20, 1998 now abandoned.

FEDERALLY SPONSORED RESEARCH

Not Applicable

BACKGROUND OF THE INVENTION

This invention relates to antennas for cellular telephone applications and, more particularly, to antennas suitable for communication from the stratosphere with earth-bound cellular users. Such users may, for example, be located in any of 96 cells arranged side-by-side in a plurality of annular bands of a circular coverage area, plus a circular central cell. Thus, with an antenna system at a lower stratosphere altitude of about 13 miles, thousands of cellular users within a circular area of the order of 400 miles in diameter may be served by a single cellular antenna system.

In current systems, in order to provide cellular service to users over a wide geographical area, a large portion of system cost relates to the need for multiple antenna sites. Due to tower height and earth curvature constraints, each antenna installation provides coverage over only a relatively small area of the earth's surface. The resulting requirement for a large number of antenna installations is further complicated by limits on availability of both suitable existing support structures for antennas and suitable sites for construction of new antenna towers. A compounding factor is a growing public aversion to additional antenna installations and towers.

As is known, the troposphere is that part of the earth's atmosphere in which temperature generally decreases with altitude, clouds form and convection currents are active. The troposphere generally extends from the surface to a height/altitude ranging from about 3.7 miles at the poles, to about 11 miles at the equator. In the stratosphere, which is located above the troposphere and continuing to a height of about 30 miles, temperature remains constant or increases slightly with altitude and relatively inactive atmospheric conditions exist. Surveillance aircraft, as well as weather balloon devices and other lighter-than-air craft, are known to operate at altitudes of 70,000 feet (13.3 miles).

Positioning an antenna system above the earth in the stratosphere for greater coverage is not practical with current types of antennas used for cellular applications. Such antennas, which are positioned and powered for coverage of cellular users located in a relatively limited geographical area, may typically provide from one to four antenna beams per azimuth sector. Even with four antenna beams per 90 degree azimuth sector, frequency allocation limitations and other constraints limit the total number of users which can simultaneously communicate via a single antenna system/site. Thus, if the coverage area of a single site were increased, operation would be subject to overload because the greater number of users in the expanded area could readily exceed the frequency allocation and operating constraints of a cellular site addressing a total of only 16 cells (four cells for each of four azimuth quadrants) for example.

As a result, even if usable with a lighter-than-air type vehicle able to be positioned relatively motionless in the lower stratosphere, the current types of typical cellular antennas would be unsuitable. This is particularly true because from stratospheric height the individual cell size (area of earth surface coverage) resulting from use of existing cellular antennas from such height would tend to encompass a greater number of users than could be serviced within frequency allocations and other system constraints. Existing antennas would be further unsuitable because of the vertical dimensioning of beams provided by such antennas and the absence of any provision for coverage in a central circular area which would lie directly below a stratosphere-located antenna.

Objects of the present invention are, therefore, to provide new and improved antenna systems for cellular use and, more particularly, to provide such antenna systems having one or more of the following characteristics and capabilities:

suitability for use from a stratosphere location;

coverage of cells arranged in annular bands within a circular coverage area;

provision of a number of simultaneous antenna beams (e.g., 97 beams) adequate to cover a large number of cells of reasonable individual area, from a stratosphere position (e.g., 13 miles altitude);

provision of dual elevation beams to double the total of individual antenna beams and individual cells;

enablement of frequency reuse patterns to permit multiple reuse (e.g., 16 times reuse) without unacceptable co-channel interference;

enablement of frequency reuse patterns to provide thousands of channels (e.g., 5800 channels) for AMPS band A or B with one composite antenna system; and reduction of sidelobe level for a multi-beam antenna by inclusion of attenuators in outermost outputs of a beam forming network.

SUMMARY OF THE INVENTION

In accordance with the invention, a cellular antenna system is arranged to communicate from a stratosphere position with earth-based users within a circular coverage area including a total of at least 80 coverage cells arranged side-by-side two concentric annular bands. The system includes a first 2-D antenna configuration, to communicate with users within a first azimuth sector of the circular coverage area, having:

(a) an array assembly with a plurality of laterally-spaced linear vertical arrays of radiating elements, (b) a plurality of first feed networks, each coupled to a vertical array to provide vertical beam coverage between a first pair of elevation angles representing the edges of a first annular band of the circular coverage area, (c) a first beam forming network having a plurality of output ports coupled to the first feed networks to produce a plurality of simultaneous side-by-side beams each providing coverage of a coverage cell located in the first annular band and within the first azimuth sector, (d) a plurality of second feed networks coupled to the first feed networks to provide, in conjunction with the first feed networks, vertical beam coverage between a second pair of elevation angles representing the edges of a second annular band of the circular coverage area, and (e) a second beam forming network having a plurality of output ports coupled to the second feed networks to produce a plurality of simultaneous side-by-side beams each providing coverage of a coverage cell located in the second annular band and within the first azimuth sector; and a plurality of additional 2-D antenna configurations, each of substantially identical description to the first 2-D antenna configuration, and each arranged to communicate with users within a different azimuth sector;

the 2-D antenna configurations arranged to provide coverage of a total of at least 80 coverage cells within the two annular bands of the circular coverage area.

In a particular configuration of a cellular antenna system, the first 2-D antenna configuration is arranged to communicate with users within 24 coverage cells within a first azimuth quadrant (e.g., 45 to 135 degrees in azimuth), and the antenna system additionally includes second, third and fourth 2-D antenna configurations, each of identical description to the first 2-D antenna configuration, and each arranged to communicate with users within a separate azimuth quadrant. The cellular antenna system is thereby arranged to provide coverage of a total of 96 coverage cells within the circular coverage area. The cellular antenna system typically additionally includes an antenna positioned below the first 2-D antenna configuration and arranged to communicate with users within a circular coverage cell located directly below the cellular antenna system. Coverage of a total of 97 cells is thereby provided.

Also in accordance with the invention, lower sidelobe beam patterns are provided by the inclusion of 6 dB attenuators coupled to the beam forming network output ports which feed the outermost vertical arrays at each end of each array assembly. The attenuators are effective to provide sidelobe reduction with accompanying slight reduction in maximum beam pattern gain, but without significant reduction in beam pattern gain at crossover between adjacent beams.

For a better understanding of the invention, together with other and further objects, reference is made to the accompanying drawings and the scope of the invention will be pointed out in the accompanying claims.

DESCRIPTION OF THE INVENTION

Figure 1:
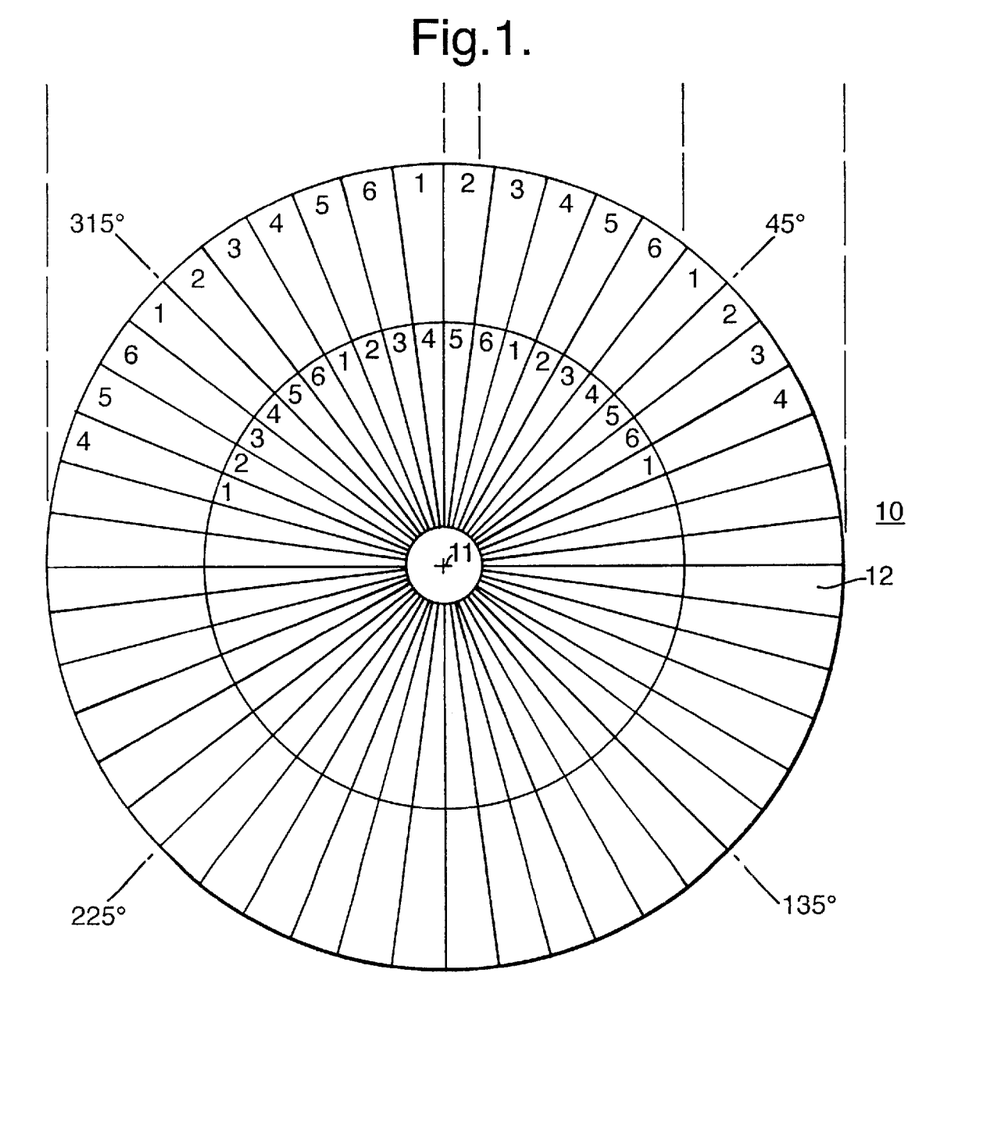
FIG. 1 shows a 400 mile diameter circular coverage area including 96 coverage cells side-by-side in two concentric annular bands, with a circular central coverage cell.

In accordance with the invention, there are disclosed cellular antenna systems suitable to be positioned in the lower stratosphere to communicate with earth-based cellular users within a circular coverage area. By use of a suitable lighter-than-air vehicle or craft, a cellular antenna system provided in accordance with the invention may typically be positioned at an altitude of about 13.3 miles for communication with users within a circular coverage area 400 miles in diameter, for example. As illustrated in FIG. 1, such coverage area 10 may comprise 96 individual coverage cells (such as coverage cell 12) arranged side-by-side within a first annular band lying between circles of 20 and 120 miles radius, and a concentric second annular band lying between circles of 120 and 200 miles radius about a point 11 located directly below the stratosphere-positioned antenna system. In this example, the central area within the 20 mile radius circle represents a separate 97th coverage cell. As will be later discussed, the repetitive numbers 1 through 6, as shown, are representative of frequency reuse patterns in the concentric bands enabling 16 times reuse of the frequency channels available in current AMPS band A or band B frequency allocation protocols.

Figure 2:
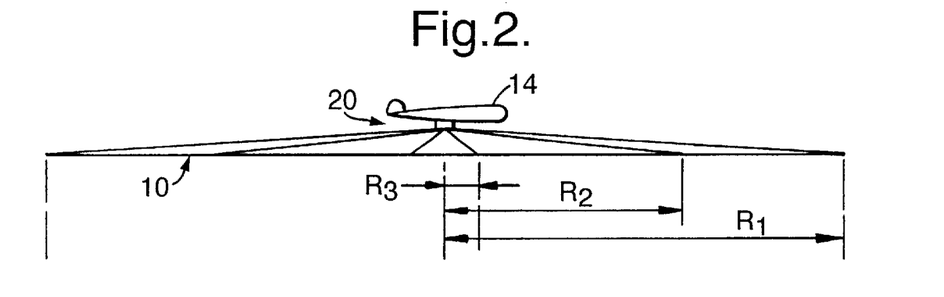
FIG. 2 is a side view representation of a cellular antenna system pursuant to the invention positioned on a stratosphere vehicle and providing 97 simultaneous beams to provide coverage of each coverage cell of the FIG. 1 circular coverage area.

FIG. 2 is a simplified, not to scale side view of a stratosphere-positioned lighter-than-air vehicle 14 supporting a cellular antenna system 20 in accordance with the invention. In FIG. 2, antenna system 20 appears merely as a small rectangle below vehicle 14, and circular coverage area 10 on the surface of the earth (shown flat for purposes of simplicity of description) is shown in edge view as a horizontal line. As will be described further, the angled lines below antenna system 20 represent the edges of a central beam illuminating the central circular area of coverage area 10 and the edges of annular patterns of beams illuminating the annular bands of side-by-side coverage cells, such as cell 12, of coverage area 10. To provide coverage of an area 10 of outside radius $R_1$ of 200 miles, the outside annular band may have an inner radius $R_2$ of 120 miles, with the inner circular cell having a radius $R_3$ of 20 miles, for example. These dimensions may be adjusted to provide cells of approximately equal area or meet other constraints in particular embodiments. For current purposes a relatively large vehicle 14 would typically be helium filled and configured for extended positioning in the relatively inactive environment of the lower stratosphere at an altitude of 13.3 miles, for example. Actual location can be determined by use of Global Positioning System (GPS) data or other suitable method. A relatively small, low-power propulsion arrangement may be provided for positioning correction via radio control from the ground. Electrical power may be made available aboard vehicle 14 by top-mounted solar panels or in other appropriate manner. Thus, the particular details, construction and capabilities of vehicle may be provided by persons skilled in relevant fields, once having an understanding of the invention and its objectives and capabilities of antenna systems based thereon.

Figure 3A:
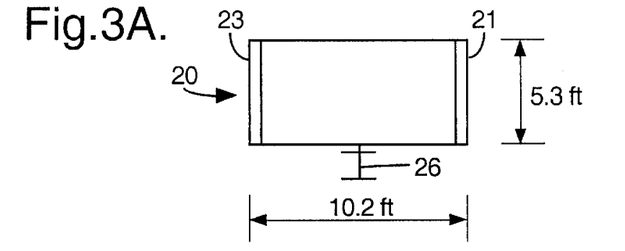
FIGS. 3A and 3B are respective side and bottom views of a cellular antenna system for use in the FIG. 2 configuration in accordance with the invention.
Figure 3B:
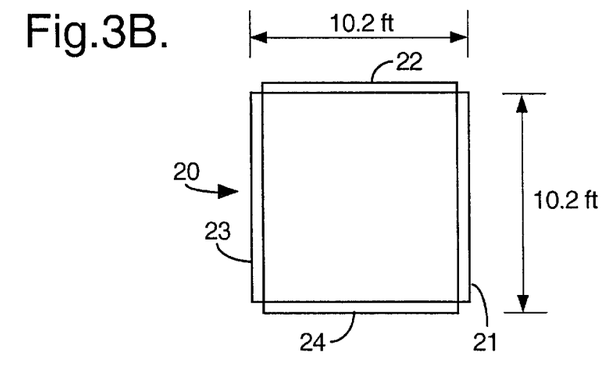

A somewhat larger external representation of a cellular antenna system 20 pursuant to the invention is shown in FIGS. 2 and 3. FIG. 2 is a simplified side view and FIG. 3 is a simplified bottom view showing a four-sided structural implementation of the radiator portions of the antenna system 20. As shown, the antenna system includes four two-dimensional (2-D) antenna configurations 21, 22, 23, 24 arranged in a square, with an additional antenna, shown as a turnstile type antenna 26, positioned at the bottom. In a typical implementation, the vertical dimension of the antenna structure, as seen in side view in FIG. 2, may be about 5.3 feet and the two horizontal dimensions of the square structural shape, as seen in bottom view in FIG. 3, may be about 10.2 feet along each side. The antenna configurations 21–24 may be aligned vertically, as shown, or may be inclined (e.g., top tilted outward at an angle of 7.5 degrees to vertical, for example).

As will be further described, each of the 2-D antenna configurations 21–24 may be arranged to provide 24 simultaneous beams arranged as 12 side-by-side beams in each of two vertically differentiated groupings (e.g., 12 upper beams above 12 middle beams). To provide such capability, each 2-D antenna configuration typically includes: two separate Butler-type beam forming networks, each to provide the 12 side-by-side beams in one of the upper and lower beam groupings for signal transmission, with two additional such beam forming networks providing 24 signal reception channels; 16 linear vertical arrays of radiating elements; and a pair of interrelated feed networks for each vertical array, each feed network of each such pair coupled to a different beam forming network.

Figure 4:
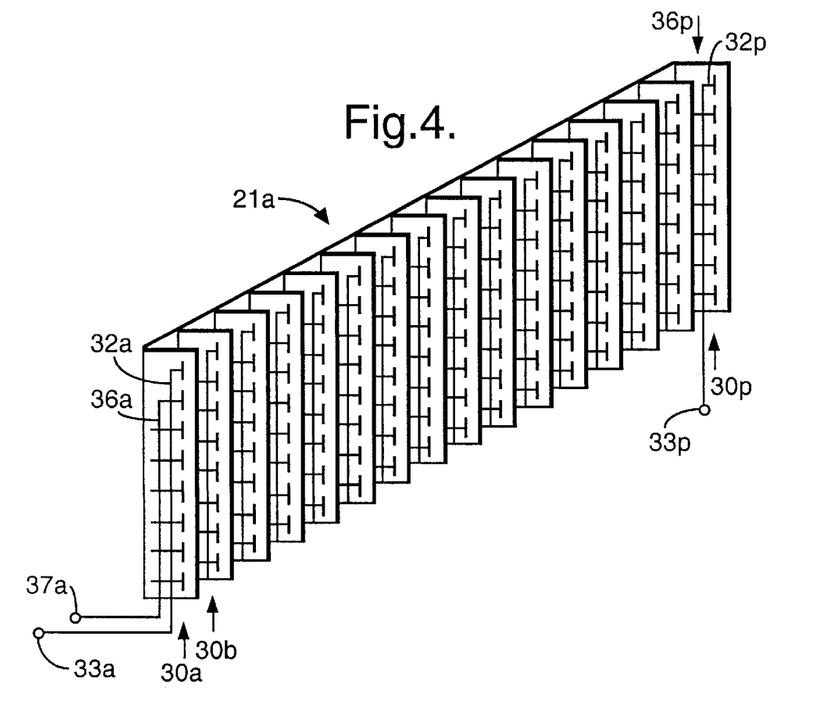
FIG. 4 shows features of an array assembly, having 16 vertical dipole arrays, for use in each of four 2-D antenna configurations of the antenna system of FIGS. 3A and 3B.

Referring now to FIG. 4, there is shown a more detailed representation of an array assembly 21a including the laterally spaced vertical arrays of radiating elements and associated feed networks of one of the four identical 2-D antenna configurations 21, 22, 23, 24 of FIG. 3 (e.g., of 2-D antenna configuration 21). The beam forming networks which are components of the 2-D antenna configuration 21 are not included in unit 21a of FIG. 4, but will be described with reference to FIG. 5. In view of the four-sided antenna implementation shown in FIG. 3, it will be appreciated that array assembly 21a of FIG. 4 may be arranged for communication with cellular users in a first azimuth segment of the circular coverage area of FIG. 1. Thus, array assembly 21a of FIG. 4 may provide coverage of the azimuth quadrant between 45 and 135 degrees as identified in FIG. 1, with identical array assemblies of the 2-D antenna configurations 22, 23 and 24 respectively providing coverage of the azimuth quadrants between 135 and 225 degrees, 225 and 315 degrees, and 315 and 45 degrees in azimuth angle.

As shown in FIG. 4, the array assembly 21a includes a plurality of laterally-spaced linear vertical arrays of radiating elements. In the embodiment illustrated there are 16 such vertical arrays 30a through 30p, each comprising eight dipoles positioned along a line extending vertically. In order to provide a light weight antenna structure, each vertical array of eight dipoles may comprise a printed conductive pattern on a thin insulative sheet, supported by low dielectric constant foam material between the vertical arrays (see discussion of FIG. 14).

The array assembly 21a of FIG. 4 also includes a plurality of first feed networks, each coupled to a vertical array of dipoles. In simplified form, the one of the first feed networks (feed network 32a) which is coupled to vertical array 30a is represented as the illustrated interconnections from input port 33a of feed network 32a to the individual dipoles of vertical array 30a. As will be described further with reference to FIG. 5, in the currently preferred embodiment it is desired to approximate a cosecant-squared radiation pattern profile. Such a radiation pattern profile (i.e., antenna gain profile) will enable the cellular antenna system to provide approximately the same antenna gain for communication with earth-bound users located at any radial distance (e.g., at any distance up to 200 miles from point 11 in FIG. 1). Using established design techniques, the actual feed network 32a is constructed so that signals as coupled from port 33a to the individual dipoles of vertical dipole array 30a are of phase and amplitude effective to provide a radiation pattern with beam coverage in elevation suitable to illuminate the outer annular band between $R_1$ and $R_2$ of the FIG. 1 circular coverage area. Thus, feed network 32a provides a radiation pattern appropriately shaped to provide coverage between a first pair of elevation angles which represent the edges of the outer annular band as seen from the stratosphere position of antenna system 20 (see FIG. 2 and description of FIG. 5). Typically, such first pair of elevation angles may desirably represent angles of 4.9 degrees and 10.0 degrees below a horizontal line across the aperture of the antenna system 20. In other words, the upper beam is proportioned to provide coverage between the elevation angles of −4.9 degrees and −10.0 degrees, so that assembly 21a provides illumination between radii $R_1$ and $R_2$ within one azimuth quadrant of area 10. Fabrication of feed network 32a to thus provide an elevation beamwidth of approximately 5 degrees at an angle effective for illumination between radii $R_1$ and $R_2$ may be accomplished by a skilled person using known techniques. Array assembly 21a will typically be aligned vertically as shown, however, in particular embodiments the face of assembly 21a may be tilted at a small angle from vertical. As will be further described with reference to FIG. 6, signals are provided to and received from the resulting beam by the combination of dipole array 30a connected to port 34a which is coupled to transmit and receive Butler beam forming networks 50 and 52. Feed network 32a may utilize couplers, phase shift devices and impedance devices in known manner to provide signals to the individual dipoles of phase and amplitude suitable to form the desired elevation beam pattern.

Before leaving FIG. 4, attention is directed to the second feed networks 36a–36p (only 36a visible), a separate one of which also serves each of the vertical dipole arrays 30a–30p. More particularly, the second feed networks are coupled to the first feed networks (see second feed network 36a coupled to first feed network 32a, which is coupled directly to the dipoles of vertical array 30a). Although illustrated in simplified fashion, it will be appreciated that by appropriately proportioning the phase and amplitude of signals provided by second feed network 36a to first feed network 32a, a beam of different centerline elevation angle and elevation beamwidth can be realized. Thus, while feed network 32a is configured to produce, in combination with the eight dipoles of vertical array 30a, a beam between the elevation angles of −4.9 and −10.0 degrees, feed network 36a is configured, taking into account the parameters of feed network 32a, to produce in combination with network 32a and the vertical array 30a, a beam approximately 30 degrees in elevation coverage between the elevation angles of −10.0 to −39.9 degrees.

Figure 5:
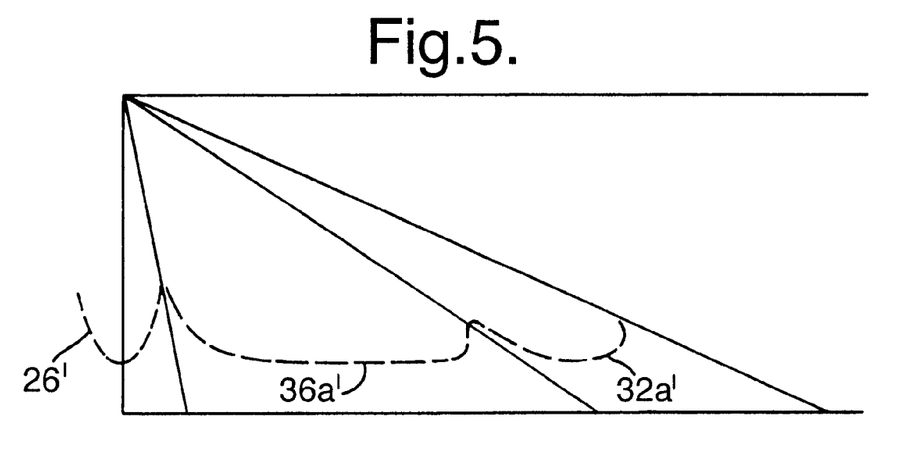
FIG. 5 is an expanded diagram of beam elevation coverage as depicted in FIG. 2.

The result is that port 37a of feed network 36a provides access to a second beam with elevation angle coverage effective to provide illumination of the inner annular band of coverage area 10 between radii $R_2$ and $R_3$. At the same time, port 33a of feed network 32a provides access to the first beam illuminating the outer annular band of coverage area 10 between radii $R_1$ and $R_2$. By approximating a cosecant-squared radiation pattern the beams provide a gain profile which can be represented by a line approximating a straight horizontal line across the regions of the two annular bands, as represented in FIG. 5. With an understanding of the invention, skilled persons using established techniques will be enabled to provide appropriate designs for the first feed networks 32a–32p and operationally interrelated second feed networks 36a–36p. More particularly, by application of a well known beam synthesis technique feed network 32a is configured to provide a beam shaped and oriented as represented at 32a' in FIG. 5. Feed network 36a is then configured to provide a beam of shape and orientation such that when combined with feed network 32a in series as represented in FIG. 4, the combination of the two networks, 32a and 36a, provides the proper relative amplitude and phase to form a beam shaped and oriented as represented at 36a' in FIG. 5. This known beam synthesis technique can be implemented so as to provide, via dipole array 30a, the described two vertical beams 32a' and 36a' at two different frequencies, via the two beam ports 33a and 37a of FIG. 4. The same dual feed network configuration (typically employing identical network element values, in relatively simple printed circuit format) is provided for each of the dipole arrays 30a–30p of array assembly 21a.

As will be understood, feed networks 36b–36p, which have the same physical relationship to respective ones of feed networks 32b–32p as feed network 36a has to feed network 32a, are positioned behind feed network 32p and are not visible in FIG. 4. As noted, typically all of feed networks 32a–32p will be identical and all of feed networks 36a–36p will be identical.

The vertical cross-section beam patterns shown in FIG. 5, represent (on an expanded vertical scale basis) the first beam 32a' between elevation angles −4.9 and −10.0 degrees accessed via port 33a, and the second beam 36a' between elevation angles −10.0 and −39.9 degrees accessed via port 37a. With provision of these two different elevation coverages, communication with cellular users in the outer and second annular bands of the FIG. 1 coverage area can be independently provided. While this dual elevation beam feature provides elevation coverage of the two concentric annular bands between radii $R_1$ and $R_2$ and radii $R_2$ and $R_3$, under control of the Butler beam forming networks, array assembly 21a provides 12 simultaneous side-by-side beams, to result in 24 beams providing coverage of all coverage cells in FIG. 1 in the quadrant between the angles of 45 and 135 degrees in the two annular bands. FIG. 5 also shows the downward-directed beam 26' provided by antenna 26 of FIG. 3 to provide coverage of the central circular coverage cell located directly below the cellular antenna system. It should be noted that the vertical scale in FIG. 5 is greatly expanded for clarity of presentation, with the result that the line along the top edge of beam 32a' appears to be at an angle much greater than −4.9 degrees.

Figure 6:
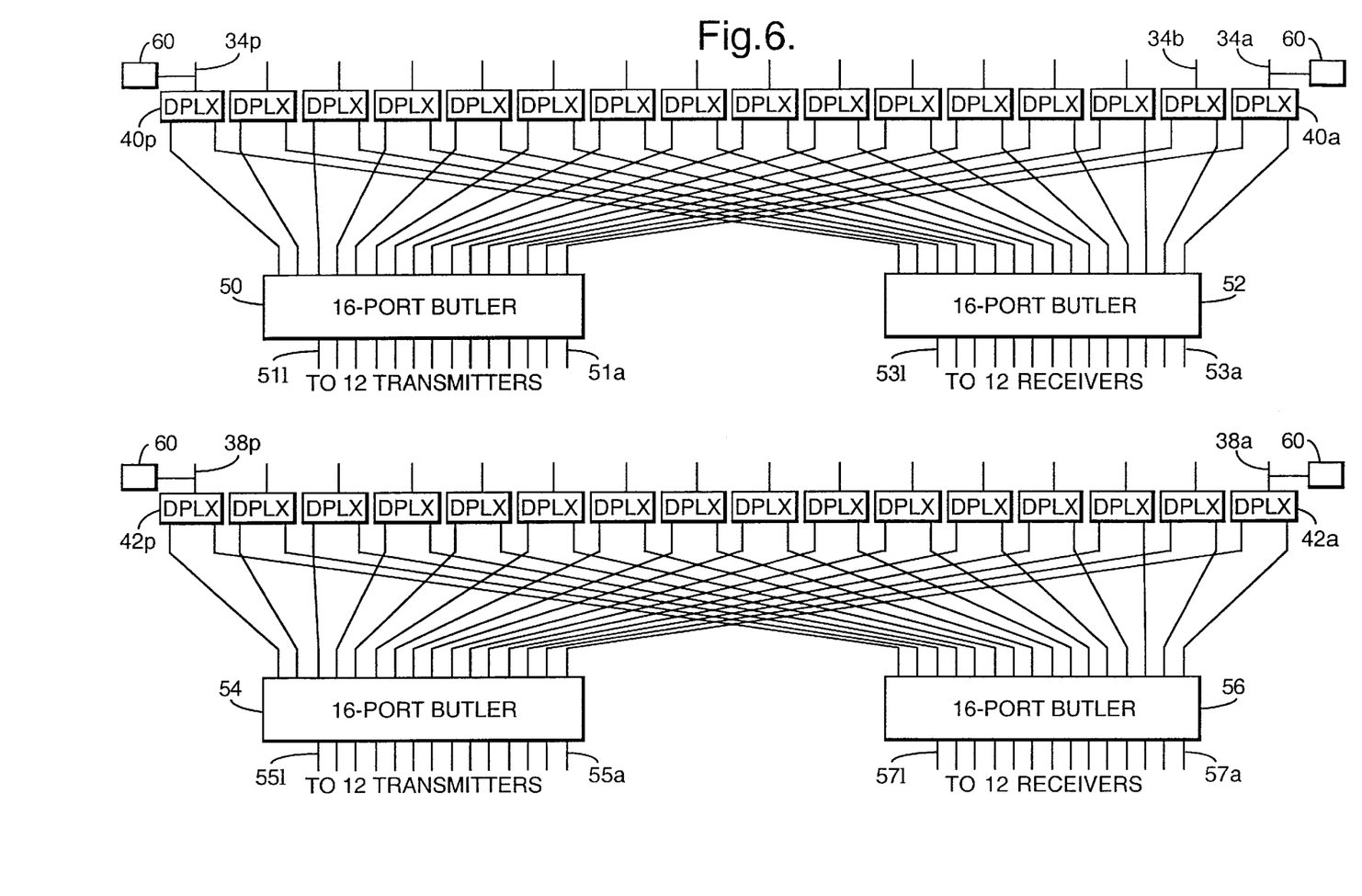
FIG. 6 illustrates beam forming network arrangements for use with the FIG. 4 array assembly.

Referring now to FIG. 6, there is shown a first beam forming network, illustrated as Butler network 50 having 16 output ports 34a through 34p. As shown, in order to address signal transmission and reception, ports 34a–34p are coupled to network 50 via individual diplexers 40a–40p, which also serve to couple ports 34a–34p to Butler network 52 arranged for reception of individual cellular user signals via the 12 beams of array assembly 21a of FIG. 4. In use, signal ports 34a–34p are connected respectively to ports 33a–33p of the feed networks 32a–32p shown in FIG. 4. The 12 beam ports 51a–51l of Butler network 50 are provided for coupling to 12 transmitters for signal transmission via the 12 side-by-side upper beams of 2-D antenna 21. Correspondingly, the 12 beam ports 52a–52l of Butler network 52 are provided for coupling to 12 receivers for signal reception via such upper beams of antenna 21. Thus, in this configuration, the first beam forming network includes separate transmit and receive Butler networks 50 and 52 coupled to the first feed networks 32a–32p via the diplexers 40a–40p.

Also included in FIG. 6 is a second beam forming network configuration utilizing transmit and receive Butler networks 54 and 56 arranged in a configuration identical to networks 50 and 52 for operation with second feed networks 36a–36p of FIG. 4. Thus, networks 54 and 56 each connect to the 16 diplexers 42a–42p for coupling via signal ports 38a–38p to respective ones of ports 37a–37p of the second feed networks 36a–36p to access the 12 side-by-side middle beams 36a' of array assembly 21a of 2-D antenna configuration 21. The 12 beam ports 55a–55l of Butler network 54 are provided for coupling to 12 transmitters for signal transmission to users in the inner band of 12 cells in the 45 to 135 degree quadrant annular cell patterns of FIG. 1 and the 12 beam ports 57a–57l of Butler network 56 are available for coupling to 12 receivers to enable reception of user signals from the same 12 cells in the inner annular band.

Figure 7:
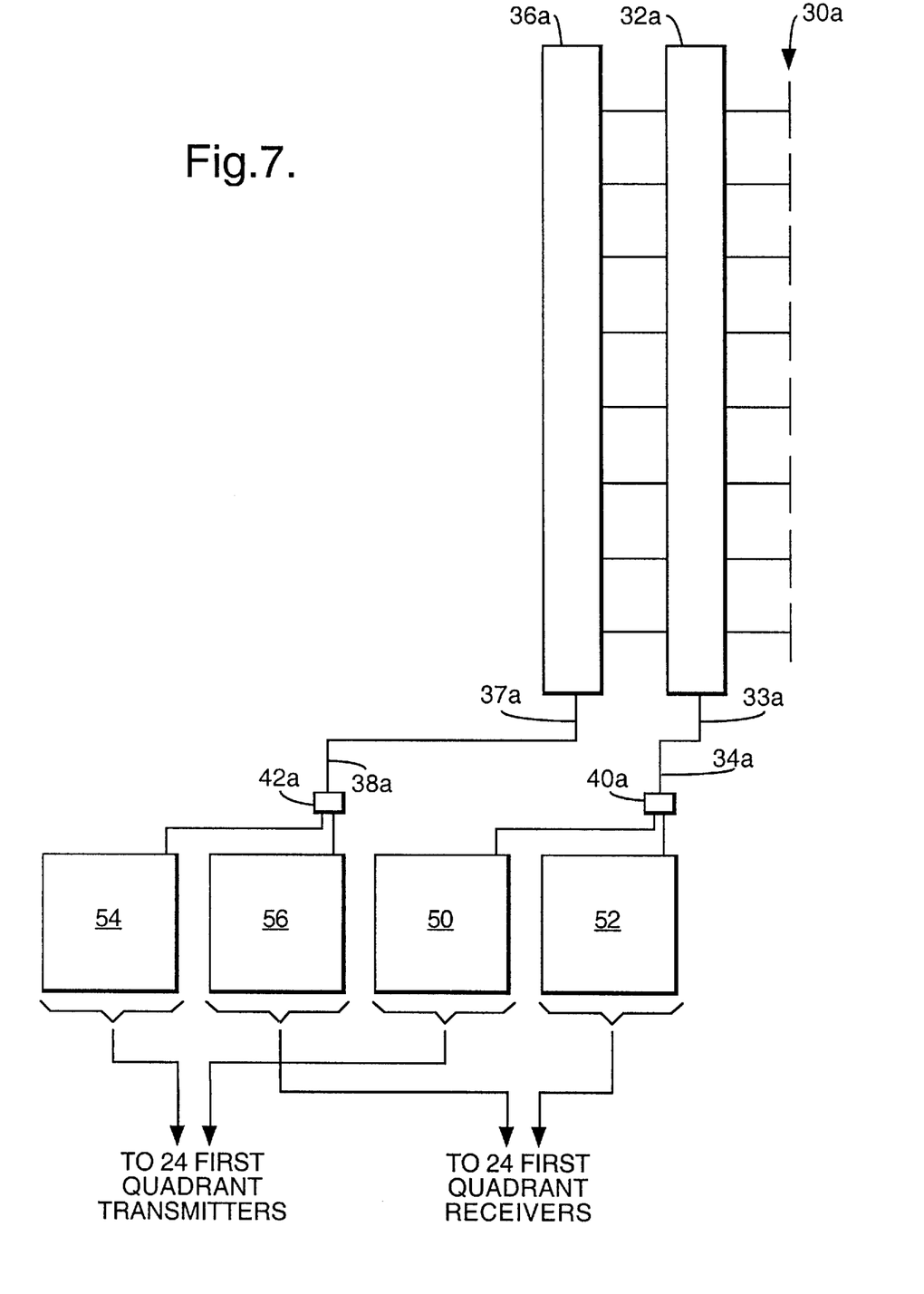
FIG. 7 is a simplified block diagram of the 2-D antenna configuration of FIGS. 4 and 5.

As described, 2-D antenna configuration 21 thus includes array assembly 21a of FIG. 4, which has 16 vertical arrays of dipoles 30a–30p fed by feed networks 32a–32p and 36a–36p, and Butler networks 50, 52, 54 and 56 of FIG. 6. FIG. 7 is a partial block diagram illustrating in simplified fashion the feed paths for a single linear vertical array of eight dipoles such as the first vertical array 30a of array assembly 21a. As shown, for signal transmission via array 30a, first feed network 32a provides signals of appropriate phase and amplitude to form beam pattern 32a' of FIG. 5. Signals are provided to feed network 32a via diplexer 40a from Butler network 50. On reception, cellular user signals received via array 30a and feed network 32a are coupled to a receiver via diplexer 40a and Butler network 52. At the same time, signals input to Butler network 54 are coupled via diplexer 42a and second feed network 36a (operating in series with first feed network 32a) to the same vertical array 30a to form beam pattern 36a' of FIG. 5. User signals received via beam pattern 36a' are coupled, via array 30a, feed networks 32a and 36a, and diplexer 42a to Butler network 56. As will be appreciated, the beam forming networks 50, 52, 54 and 56 utilize signals from the 16 vertical arrays 30a–30b to form composite radiation patterns including 12 side-by-side beams, with signals for each beam respectively associated with one of the 12 beam ports of each Butler network (e.g., beam ports 51a–51l of network 50 shown in FIG. 6).

Figure 8:
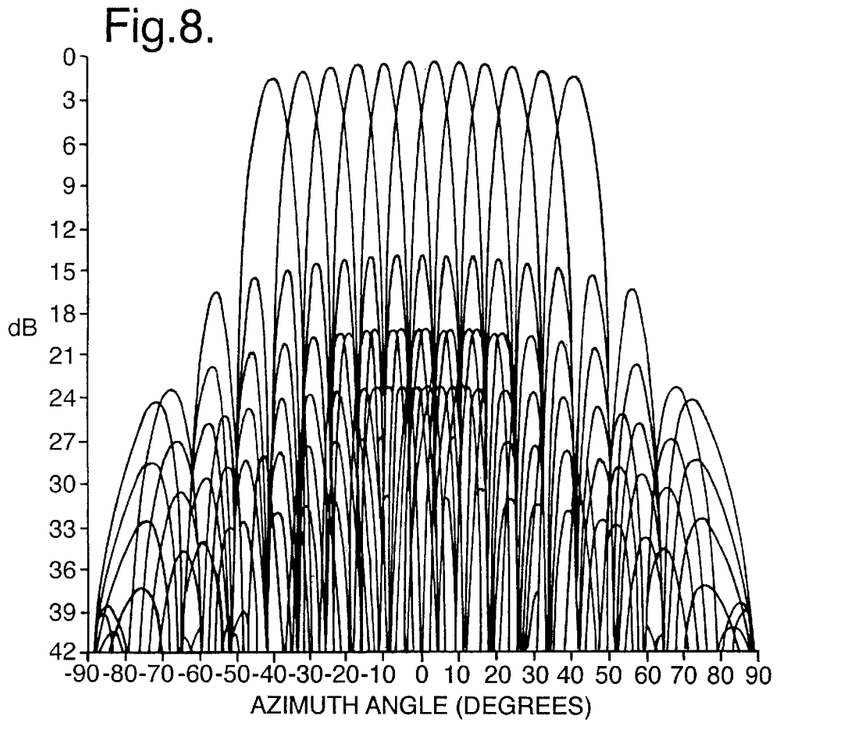
FIG. 8 is a computer generated antenna pattern for 12 beam coverage provided by the FIG. 4 array assembly.
Figure 9:
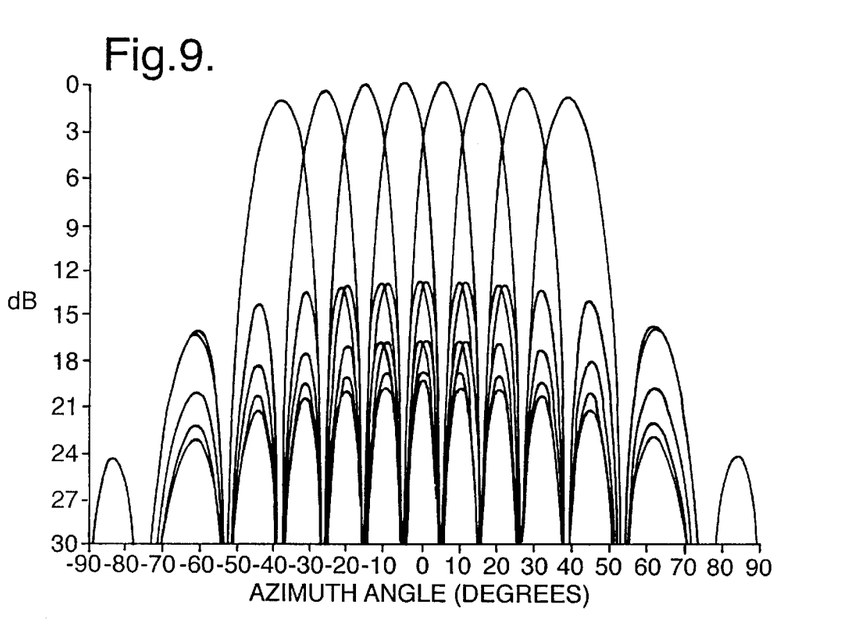
FIGS. 9 and 10 are antenna patterns illustrating the effect of inclusion of 6 dB edge feed attenuation pursuant to the invention, for an 8 beam array assembly.
Figure 10:
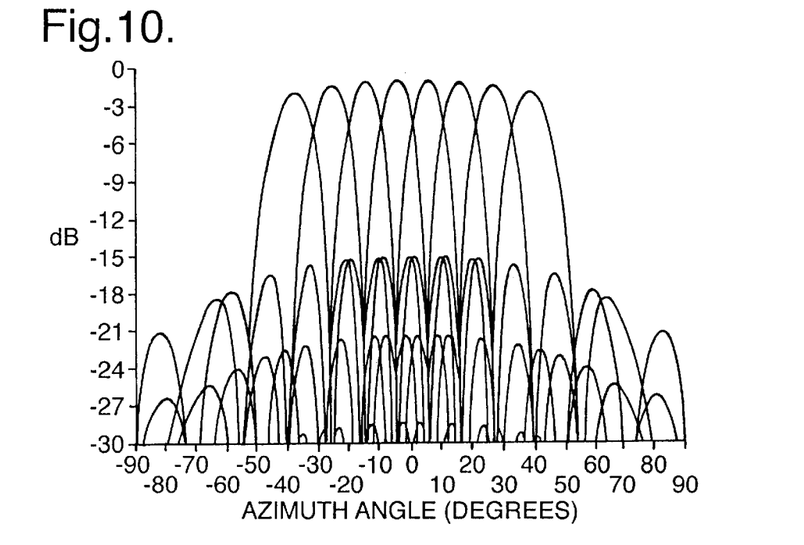

Referring now to FIGS. 8, 9 and 10 there are shown computer generated beam patterns illustrative of horizontal coverage of a single 2-D antenna configuration, such as unit 21 of FIGS. 3A and 3B which utilizes array assembly 21a of FIG. 4. FIG. 8 shows a complete set of 12 beam patterns for array assembly 21a of FIG. 4 fed by a Butler network of FIG. 6. In accordance with a currently preferred embodiment, in the FIG. 8 pattern peak overlapping sidelobes are reduced to −30 dB (from a nominal −23 dB for this form of Butler network driven array) by inclusion of 6 dB of attenuation of signal levels for the two edge arrays (outermost vertical dipole arrays 30a and 30p at each end of array assembly 21a of FIG. 4). With the inclusion of 6 dB attenuators to provide sidelobe reduction, peak gain of individual beams is reduced by 0.6 dB, however the beam crossover level, determinative of coverage range for the lower gain areas between beams, is not decreased and remains at −4 dB. The devices for providing 6 dB attenuation for this purpose are represented by boxes 60 in FIG. 6. Although shown connected to diplexer signal paths in FIG. 5 for purposes of illustration, it will be understood that pursuant to the invention appropriate attenuation devices may be employed in series arrangement in the signal path. FIGS. 9 and 10 show a comparison of computer generated beam patterns with and without the 6 dB outer element attenuation feature for a set of 8 beams.

For purposes of comparison regarding the 6 dB outer element attenuation feature, FIGS. 9 and 10 show computer generated beam patterns without and with such attenuation. FIG. 9 is the pattern for a 10 port Butler matrix driving a 10 element array to provide 8 beams. FIG. 10 is the pattern for the same arrangement with addition of 6 dB attenuation in the signal path to each of the outermost elements (i.e., elements 1 and 10). As shown, with the edge elements attenuated the gain at the crossover angles between individual beams is not decreased and the sidelobes from a beam that is separated from another beam by at least three beamwidths are more than 21 dB down from beam peak.

The aforementioned level of sidelobes interactively affecting beams separated by three beamwidths is relevant to frequency reuse allocations along the horizontal plane. As shown in FIG. 1, the 200 mile radius circle is partitioned into 96 substantially rectangular cells and one central circular cell. The available frequency channels are partitioned into 7 groups. One frequency group is assigned to the center circular cell. The remaining 6 groups of frequencies are assigned to the 96 rectangular cells in a pattern that enables 16 times reuse of these frequencies. The reuse pattern is indicated by the 1 to 6 repetitive numbering pattern of cells in FIG. 1. For AMPS band A or band B there are 416 frequencies available. Each of the 6 groups, for example, can be assigned 59 frequencies, with 62 frequencies for the central cell. The total number of control and traffic channels for an AMPS A or B provider would thus be 59×6×16+62=5,726. As an alternative, with 60 frequencies assigned to each of the 6 groups, and 56 frequencies for the central cell, the total channels would equal 60×6×16+56=5,816.

It will thus be appreciated that pursuant to the invention, there are utilized multiple beam array assemblies providing for increased frequency use along the horizontal plane. If, as typical in prior usage, a 90 degree sector were to be covered by a 4 beam antenna, every other beam could be assigned the same frequency group. However, for that arrangement the overlapping sidelobe level would be about −12 dB, which does not provide a satisfactory co-channel interference level. Pursuant to the invention, with 12 side-by-side beams per quadrant every sixth beam can be assigned the same frequency group to provide cell coverage as represented in FIG. 1. As between two annular bands of cells, frequency groups for the inner annular band of cells can be offset as shown in FIG. 1, relative to the frequency group allocations for the outer band. Thus, as shown, while the frequency group allocations repeat every seventh cell, the offset results in frequency group 4 for an inner band cell being radially adjacent to frequency group 1 of an outer band cell. With this arrangement the overlapping sidelobe level is −23 dB, which provides an acceptable level of co-channel interference suppression. The FIG. 1 frequency group allocation pattern, with 12 beams per quadrant, provides an 8 times frequency reuse for each annular band of cells and thus 16 times frequency reuse with the staggered frequency group allocation for the two annular bands of cells of FIG. 1. As noted, a separate seventh frequency group is allocated to the central circular cell, thereby providing an adequate level of co-channel interference suppression between the central cell and the other 96 cells of the FIG. 1 pattern. With respect to the vertical plane beam profiles represented in FIG. 5, by approximating a cosecant-squared power pattern relative to gain versus radial distance for the vertical profile characteristics of beam shapes 26', 32a' and 36a', range dependence for up link operation can be effectively neutralized so that co-channel interference levels are primarily dependent upon the horizontal beam patterns.

With use of 6 dB attenuation of edge element signal levels as described, the overlapping sidelobe level (as discussed above at the −23 dB level) can be reduced to −31 dB. Inclusion of such attenuation pursuant to the invention thus provides an extra margin in suppressing co-channel interference, by reducing such levels even further. With system coverage inherently limited by gain/maximum range at the crossover angle between two beams, introduction of the edge element attenuators provides lower sidelobes with no degradation of array gain at the beam crossover angles, as discussed above. While a particular frequency group allocation pattern has been described, other variations and patterns may be employed in particular embodiments in view of functional requirements, such as the required total number of control and traffic channels.

Figure 11:
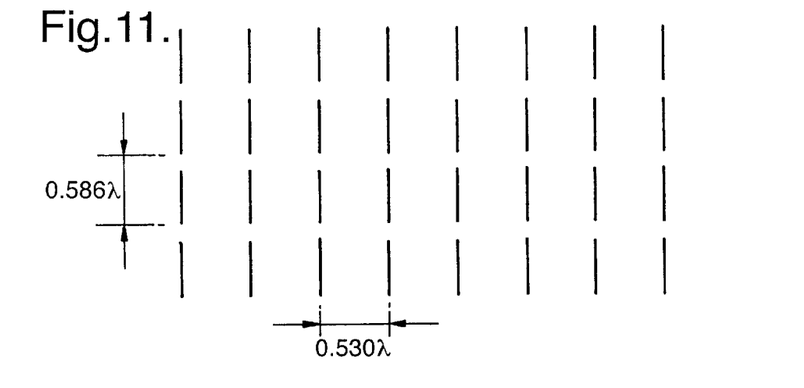
FIGS. 11 and 12 illustrate dipole alignment patterns for vertical polarization and plus and minus 45 degree polarization, respectively, for use in antenna systems pursuant to the invention.
Figure 12:
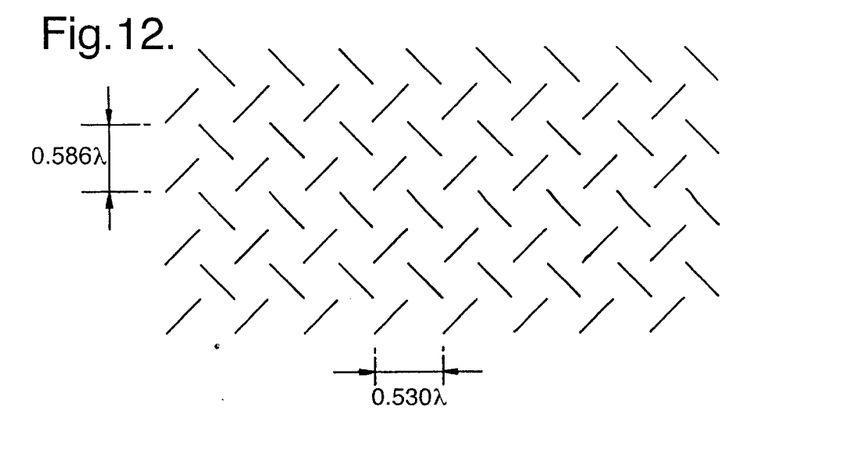
Figure 13:
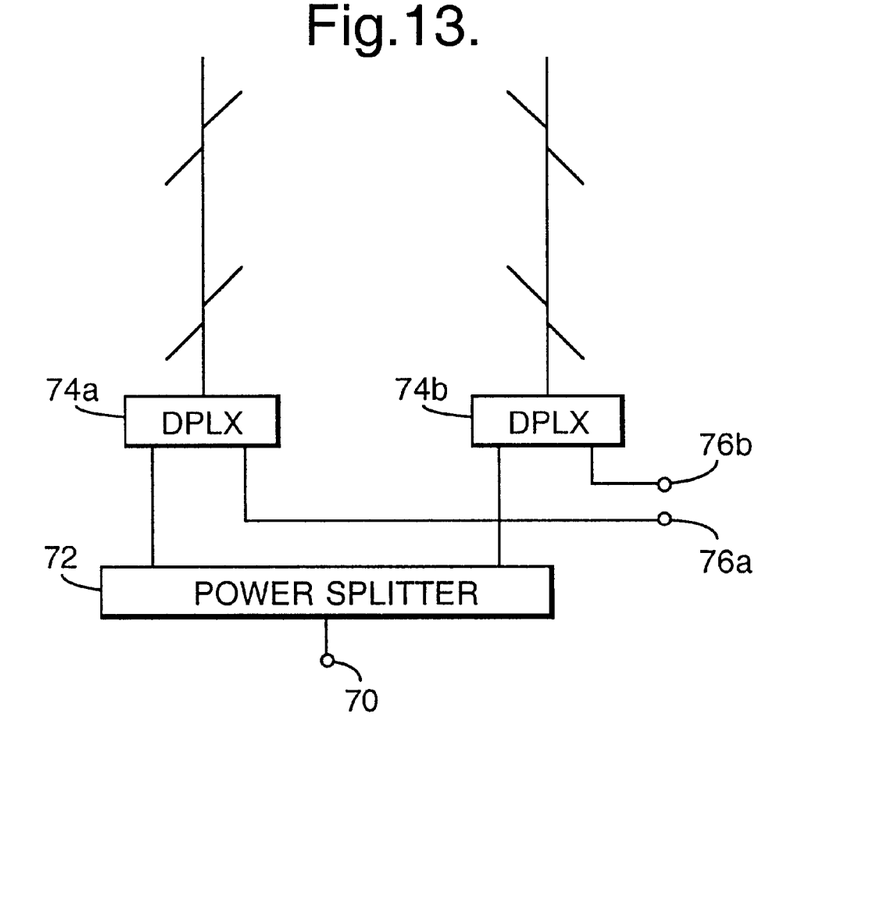
FIG. 13 illustrates a duplex feed arrangement for a dual-polarized antenna using a dipole pattern as in FIG. 12 to transmit with dual polarization from a single input and receive the two 45 degree polarization signals separately.

Referring now to FIG. 11, there are indicated the form and relative dimensions of a section of array grid suitable for vertical polarization operation with 16 vertical arrays of 8 dipoles each (as discussed with reference to array 21a of FIG. 4). FIG. 12 shows an alternative configuration usable in the context of FIG. 4 to provide an array having 16 vertical arrays of dipoles arranged for +45 degree polarization and 16 vertical arrays of dipoles arranged for −45 degree polarization. FIG. 13 illustrates a duplex arrangement usable for each two adjacent vertical arrays of the FIG. 12 configuration to enable signal transmission with vertical polarization and signal reception of both signals received with −45 degree polarization and signals received with +45 degree polarization. Thus, in operation, signals input at terminal 70 are split at power splitter 72 and provided via diplexers 74a and 74b for radiation at both −45 and +45 degrees linear polarization. The combined result is radiation of vertically polarized signals. For reception, signals of +45 and −45 degrees polarization are independently received and made available at terminals 76a and 76b, respectively, when the FIG. 13 arrangement is used with the dipole array configuration of FIG. 12. Typical dipole-to-dipole dimensions of 0.586 wavelengths vertically and 0.530 wavelengths horizontally are indicated in FIGS. 11 and 12.

Figure 14:
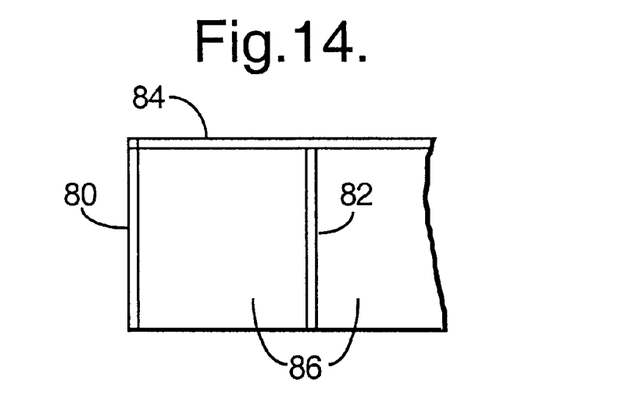
FIG. 14 is a plan view of a portion of the array assembly of FIG. 4.

FIG. 14 is a plan view of a small portion of array assembly 21a of FIG. 4 illustrating a form of lightweight construction suitable for stratosphere use. As shown, 80 and 82 are thin dielectric sheets bearing conductive patterns comprising dipoles (e.g., dipole arrays 30a and 30b) and feed networks (e.g., feed networks 32a and 36a, and 32b and 36b), 84 is a thin dielectric backplane sheet with an electrically conductive front surface and 86 indicates low dielectric-constant foam filler material positioned in the open areas between the dielectric sheets to provide support and structural rigidity.

While there have been described the currently preferred embodiments of the invention, those skilled in the art will recognize that other and further modifications may be made without departing from the invention and it is intended to claim all modifications and variations as fall within the scope of the invention.

What is claimed is:

1. A cellular antenna system, to communicate from a stratosphere position with earth-based users within a circular coverage area including at least 80 coverage cells arranged side-by-side in a plurality of annular bands, the system comprising:

a first 2-D antenna configuration, to communicate with users within a first azimuth sector of the circular coverage area, including
  (a) an array assembly having a plurality of laterally-spaced linear vertical arrays of radiating elements,
  (b) a plurality of first feed networks, each coupled to a said vertical array to provide vertical beam coverage between a first pair of elevation angles representing the edges of a first annular band of said circular coverage area,
  (c) a first beam forming network having a plurality of signal ports coupled to said first feed networks to produce a plurality of simultaneous side-by-side beams each providing coverage of a coverage cell located in said first annular band and within said first azimuth sector,
  (d) a plurality of second feed networks coupled to said first feed networks to provide, in conjunction with said first feed networks, vertical beam coverage between a second pair of elevation angles representing the edges of a second annular band of said circular coverage area, and
  (e) a second beam forming network having a plurality of signal ports coupled to said second feed networks to produce a plurality of simultaneous side-by-side beams each providing coverage of a coverage cell located in said second annular band and within said first azimuth sector; and a plurality of additional 2-D antenna configurations, each of substantially identical description to said first 2-D antenna configuration, and each arranged to communicate with users within a different azimuth sector;

said 2-D antenna configurations arranged to provide coverage of a total of at least 80 coverage cells within said annular bands of said circular coverage area.

2. A cellular antenna system as in claim 1, wherein said first 2-D antenna configuration is arranged to communicate with users within 24 coverage cells within a first azimuth quadrant, and the antenna system additionally includes second, third and fourth 2-D antenna configurations, each of identical description to said first 2-D antenna configuration, and each arranged to communicate with users within a separate azimuth quadrant;

the cellular antenna system thereby arranged to provide coverage of a total of 96 coverage cells within two concentric annular bands of said circular coverage area.

3. A cellular antenna system as in claim 1, additionally including an antenna positioned below said first 2-D antenna configuration and arranged to communicate with users within a circular coverage cell located directly below the cellular antenna system.

4. A cellular antenna system as in claim 3, wherein each said 2-D antenna configuration includes an array assembly comprising 16 laterally spaced linear vertical arrays of 8 dipoles each, and wherein each of said first and second beam forming networks is a Butler network having 16 output ports providing signal proportioning effective to cause said 16 vertical arrays to provide a 12 beam radiation pattern.

5. A cellular antenna system as in claim 1, wherein lower sidelobe beam patterns are provided by the inclusion of 6 dB attenuators coupled to the beam forming network output ports which feed the outermost vertical arrays at each end of each said array assembly, said attenuators effective to provide sidelobe reduction with accompanying reduction in maximum beam pattern gain, but without significant reduction in beam pattern gain at crossover between adjacent beams.

6. A cellular antenna system as in claim 1, wherein said array assembly comprises laterally spaced linear vertical arrays of dipoles formed of conductive patterns on thin insulative sheet material supported by lightweight low dielectric value foam material.

7. A cellular antenna system as in claim 6, wherein said array assembly comprises 16 laterally spaced linear vertical arrays of 8 dipoles each.

8. A cellular antenna system as in claim 1, wherein each said 2-D antenna configuration includes an array assembly comprising 16 laterally spaced linear vertical arrays of 8 dipoles each, and wherein each of said first and second beam forming networks is a Butler network having 16 output ports providing signal proportioning effective to cause said 16 vertical arrays to provide a 12 beam radiation pattern.

9. A cellular antenna system, to communicate from a stratosphere position with earth-based users within a circular coverage area including coverage cells arranged side-by-side in an annular pattern, the system comprising:

a first 2-D antenna configuration, to communicate with users within a first azimuth sector of the circular coverage area, including
  (a) an array assembly having a plurality of laterally-spaced linear vertical arrays of radiating elements,
  (b) a plurality of first feed networks, each coupled to a said vertical array to provide vertical beam coverage between a first pair of elevation angles representing the edges of a first annular band of said circular coverage area, and
  (c) a first beam forming network having a plurality of output ports coupled to said first feed networks to produce a plurality of simultaneous side-by-side beams each providing coverage of a coverage cell located in said first annular band and within said first azimuth sector;

a plurality of additional 2-D antenna configurations, each of substantially identical description to said first 2-D antenna configuration, and each arranged to communicate with users within a different azimuth sector; and an antenna positioned below said 2-D antenna configurations and arranged to communicate with users within a circular coverage cell located directly below the cellular antenna system.

10. A cellular antenna system as in claim 9, wherein said first 2-D antenna configuration is arranged to communicate with users within a first azimuth quadrant, and the antenna system additionally includes second, third and fourth 2-D antenna configurations, each of identical description to said first 2-D antenna configuration, and each arranged to communicate with users within a separate azimuth quadrant.

11. A cellular antenna system as in claim 9, wherein lower sidelobe beam patterns are provided by the inclusion of 6 dB attenuators coupled to the beam forming network output ports which feed the outermost vertical arrays at each end of each said array assembly.

12. A cellular antenna system as in claim 9, wherein said array assembly comprises laterally spaced linear vertical arrays of dipoles formed of conductive patterns on thin insulative sheet material supported by lightweight low dielectric value foam material.

13. A cellular antenna system as in claim 12, wherein said array assembly comprises 16 laterally spaced linear vertical arrays of 8 dipoles each.

14. A cellular antenna system as in claim 9, wherein each said 2-D antenna configuration includes an array assembly comprising 16 laterally spaced linear vertical arrays of 8 dipoles each, and wherein said first beam forming network is a Butler network having 16 output ports providing signal proportioning effective to cause said 16 vertical arrays to provide a 12 beam radiation pattern.

15. A cellular antenna system, having a multi-beam antenna pattern with reduced sidelobe levels, comprising:
    an array assembly having 16 laterally-spaced linear vertical arrays of radiating elements;
    a Butler beam forming network having 16 output ports, each coupled to a said vertical array to provide 12 side-by-side beams; and
    two 6 dB attenuator devices, one coupled to each beam forming network output port which feeds the outermost vertical array at each end of said array assembly;
    said attenuators effective to provide sidelobe reduction with accompanying reduction in maximum beam pattern gain, but without significant reduction in beam pattern gain at crossover between adjacent beams.

16. A cellular antenna system, to communicate from above the earth down to earth-based users within coverage cells arranged side-by-side in an annular pattern, the system comprising:
    a first 2-D antenna configuration, to communicate with users within a 90 degree first azimuth sector, including
        (a) an array assembly having 16 laterally-spaced linear vertical arrays each having 8 dipole radiating elements,
        (b) a total of 16 first feed networks, each coupled to a said vertical array to provide vertical beam coverage between a first pair of elevation angles representing a first pair of radii of said annular pattern of coverage cells,
        (c) a Butler type first beam network having 16 output ports coupled to said first feed networks to produce 12 simultaneous side-by-side beams providing coverage of cells located between said first pair of radii and within said first azimuth sector,
        (d) a total of 16 second feed networks coupled to said first feed networks to provide, in conjunction with said first feed networks, vertical beam coverage between a second pair of radii of said annular pattern of coverage cells, and
        (e) a Butler type second beam network having 16 output ports coupled to said second feed networks to produce 12 simultaneous side-by-side beams providing coverage of cells located between said second pair of radii and within said first azimuth sector;
    second, third and fourth 2-D antenna configurations, each of identical description to said first 2-D antenna configuration, and each arranged to communicate with users within a separate azimuth quadrant; and
    an antenna positioned below said 2-D antenna configurations and arranged to communicate with users within a circular area directly below the cellular antenna system.

17. A cellular antenna system as in claim 16, wherein each said array assembly comprises laterally spaced linear vertical arrays of dipoles formed of conductive patterns on thin insulative sheet material supported by lightweight low dielectric value foam material.

18. A cellular antenna system, to communicate from a stratosphere position with earth-based users within a circular area including coverage cells arranged side-by-side in an annular pattern, the system comprising:
    a first 2-D antenna configuration, to communicate with users within a first azimuth sector of the circular area, including
        (a) an array assembly having a plurality of laterally-spaced linear vertical arrays of radiating elements,
        (b) a plurality of first feed networks, each coupled to a said vertical array to provide vertical beam coverage between a first pair of elevation angles representing the edges of a first annular band of said circular area, and
        (c) a first beam forming network having a plurality of output ports coupled to said first feed networks to produce a plurality of simultaneous side-by-side beams each providing coverage of a coverage cell located in said first annular band and within said first azimuth sector.

19. A cellular antenna system as in claim 18, additionally comprising:
    a plurality of additional 2-D antenna configurations, each of substantially identical description to said first 2-D antenna configuration, and each arranged to communicate with users within a different azimuth sector.

20. A cellular antenna system as in claim 18, additionally comprising:
    (d) a plurality of second feed networks coupled to said first feed networks to provide, in conjunction with said first feed networks, vertical beam coverage between a second pair of elevation angles representing the edges of a second annular band of said circular area, and
    (e) a second beam forming network having a plurality of signal ports coupled to said second feed networks to produce a plurality of simultaneous side-by-side beams each providing coverage of a coverage cell located in said second annular band and within said first azimuth sector.

21. A cellular antenna system as in claim 20, additionally comprising:
    a plurality of additional 2-D antenna configurations, each of substantially identical description to said first 2-D antenna configuration, and each arranged to communicate with users within a different azimuth sector.

* * * * *